United States Patent [19]
Carter

[11] Patent Number: 5,842,329
[45] Date of Patent: Dec. 1, 1998

[54] ADJUSTABLE LAWN MOWER HANDLE MOUNT

[75] Inventor: David J. Carter, Fort Mill, S.C.

[73] Assignee: Deere & Company, Charlotte, N.C.

[21] Appl. No.: 734,927

[22] Filed: Oct. 22, 1996

[51] Int. Cl.$^6$ ................................................. A01D 34/82
[52] U.S. Cl. .......................... 56/2; 56/16.7; 56/DIG. 18; 16/111 A; 403/103; 280/47.371
[58] Field of Search ............................. 56/16.7, DIG. 18, 56/1, 2; 403/87, 84, 103, 91; 16/111 A; 248/292.12; 7/107; 280/47.371

[56] References Cited

U.S. PATENT DOCUMENTS

| 854,424 | 5/1907 | Ketterer | 56/DIG. 18 X |
|---|---|---|---|
| 2,658,322 | 11/1953 | Sullivan | 16/111 A |
| 2,965,386 | 12/1960 | Buske | |
| 3,694,855 | 10/1972 | Meyer et al. | 16/111 A |
| 3,764,156 | 10/1973 | Nepper et al. | 280/47.37 |
| 3,791,116 | 2/1974 | Wykhuis | 56/17.5 |
| 3,817,547 | 6/1974 | Erickson | 280/47.37 |
| 4,006,914 | 2/1977 | Koch | 280/47.37 R |
| 4,561,239 | 12/1985 | Cook | 56/320.1 |

*Primary Examiner*—Heather Shackelford
*Attorney, Agent, or Firm*—Perman & Green, LLP

[57] ABSTRACT

A lawn mower with a frame, a motor, a handle pivotably connected to the frame, a handle adjustment bracket and a fastener assembly. The bracket has a first end pivotably connected to the frame and a second end adjustably connected to the handle by the fastener assembly. The bracket has a slot and recessed seats along the slot.

15 Claims, 3 Drawing Sheets

ADJUSTABLE LAWN MOWER HANDLE MOUNT

BACKGROUND OF THE INVENTION

1. Field of the Invention

The present invention relates to lawn mowers and, more particularly, to an adjustable handle mount.

2. Prior Art

U.S. Pat. No. 3,817,547 discloses a lawn mower handle mount with a bracket pivotally connected to a frame. The bracket has three holes to allow adjustable connection to the handle. Other related U.S. patents include Nos. 3,791,116; 4,561,239; 4,006,914; 2,965,386; 3,694,855; and 3,764,156.

SUMMARY OF THE INVENTION

In accordance with one embodiment of the present invention, a lawn mower is provided having a frame, a motor mounted on the frame, and a handle pivotably connected to the frame. The lawn mower further comprises a handle adjustment bracket and a fastener assembly. The bracket has a first end pivotally connected to the frame and a second end. The second end has a slot therethrough with multiple recessed seats along the slot. The fastener assembly extends through the handle and through the slot in the bracket to connect the second end of the bracket to the handle. The fastener assembly has a first fastener with a head located in one of the seats to stationarily fix the head relative to the bracket and thereby stationarily fix the handle on the bracket.

In accordance with another embodiment of the present invention, a lawn mower is provided comprising a frame, a motor, a handle pivotably connected to the frame, and a handle adjustment bracket. The bracket is connected between the frame and the handle. The bracket comprises a one piece member with a slot therethrough and recessed seats along and intersecting the slot. The slot interconnects the recessed seats.

In accordance with another embodiment of the present invention, a lawn mower is provided comprising a frame, a motor, a handle pivotably connected to the frame and a handle adjustment bracket connected between the frame and the handle by a fastener at a connection. The connection of the bracket in the handle with the fastener has means for loosening the fastener and adjusting the relative position of the handle and bracket without removing the fastener from the connection.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 1:
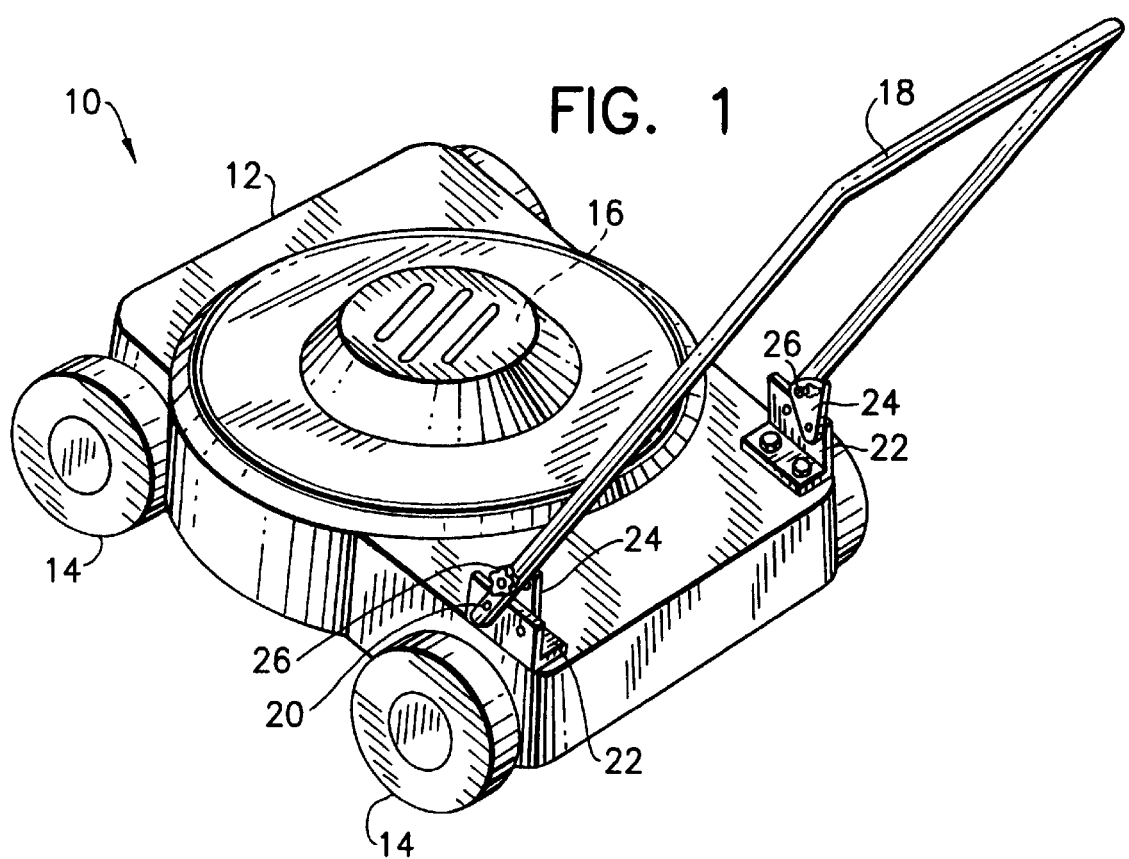
FIG. 1 is a perspective view of a lawn mower incorporating features of the present invention.

Referring to FIG. 1, there is shown a lawn mower 10 incorporating features of the present invention. Although the present invention will be described with reference to the single embodiment shown in the drawings, it should be understood that features of the present invention can be embodied in different alternative embodiments. In addition, any suitable size, shape or type of elements or materials could be used.

Figure 2:
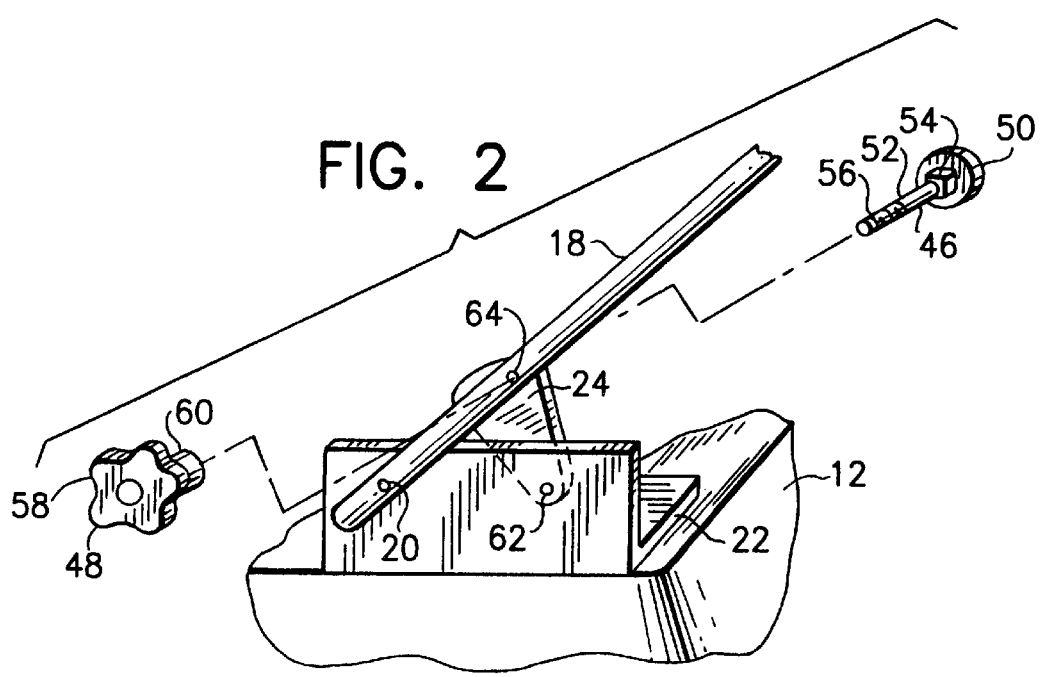
FIG. 2 is a partial view of the connection of the handle to the frame of the lawn mower shown in FIG. 1.

The lawn mower 10 generally comprises a frame 12, wheels 14, a motor 16, a blade (not shown) and a handle 18. Referring also to FIG. 2, the handle 18 is pivotably connected at pins 20 to mounting plates 22 of the frame 12. In alternate embodiments, any suitable type of moveable connection to the frame could be provided. The connection of the handle 18 to the frame 12 further comprises two adjustable mounting brackets 24 and two fastener assemblies 26.

Figure 3:
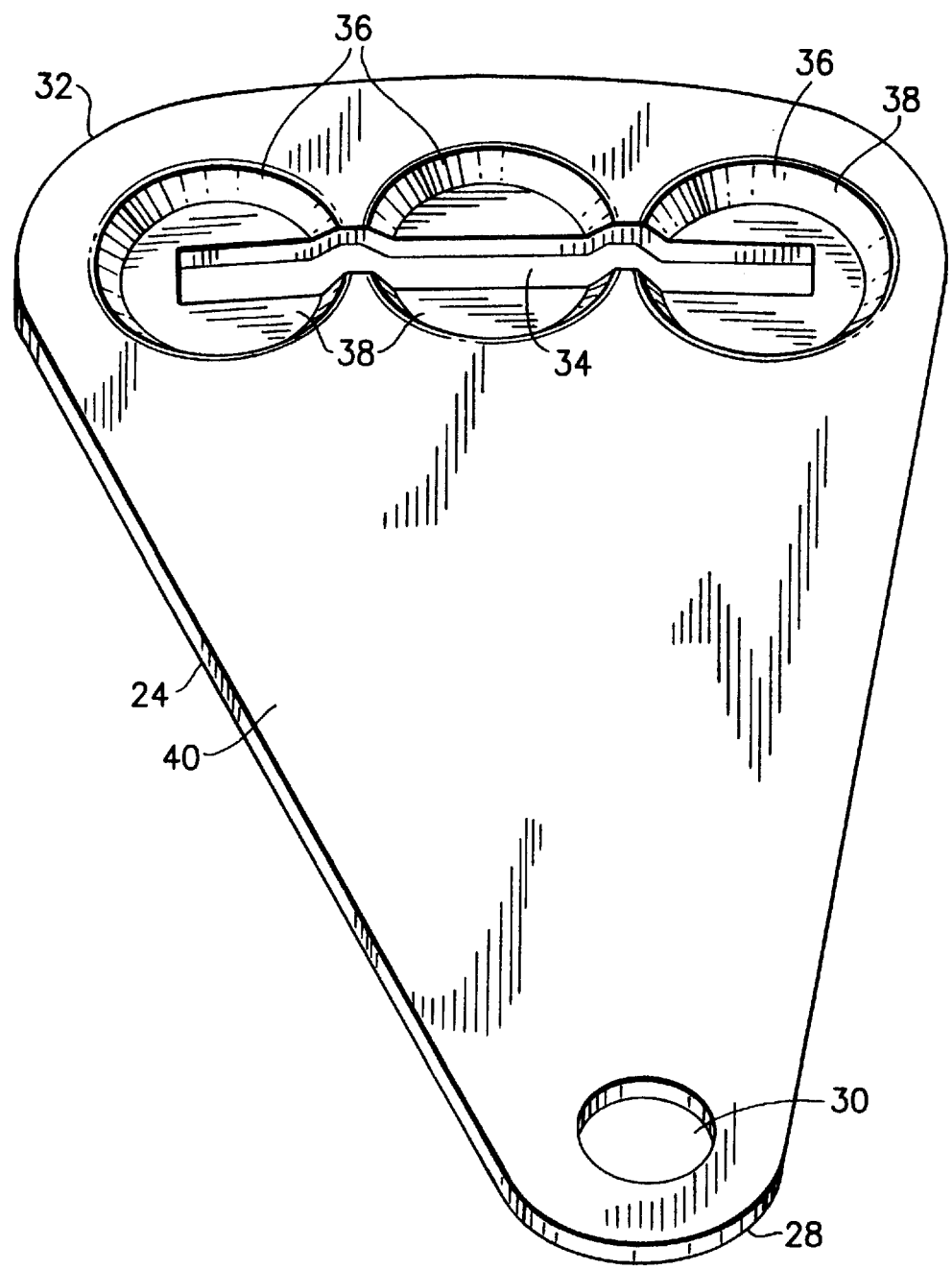
FIG. 3 is a perspective view of the handle adjustment bracket shown in FIG. 2.
Figure 4:
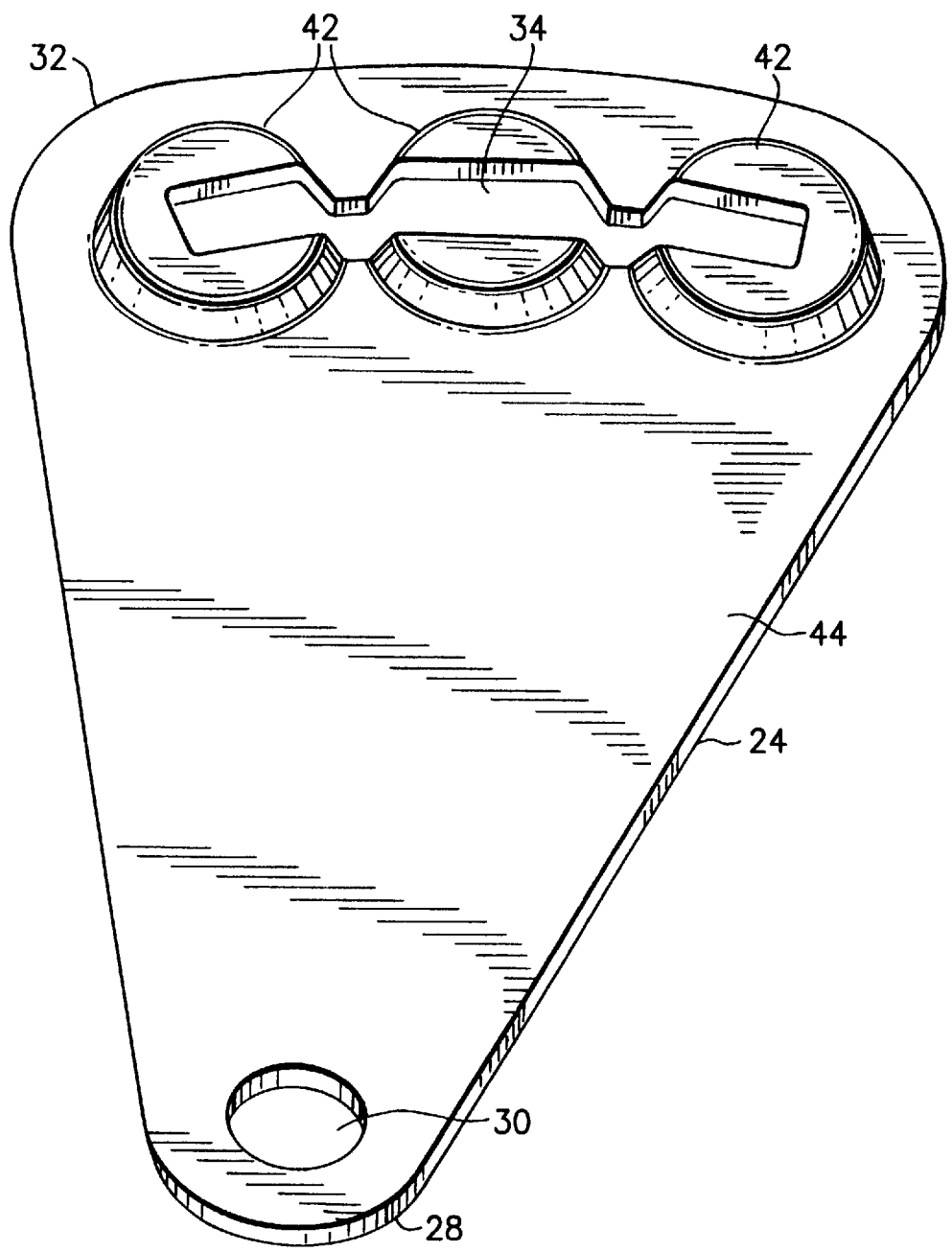
FIG. 4 is a perspective view of the handle adjustment bracket shown in FIG. 3 from the opposite side.

Referring also to FIGS. 3 and 4, the adjustable mounting bracket 24 is shown. The bracket 24 is preferably a one-piece metal plate with a general triangular shape. A lower end 28 of the bracket 24 has a hole 30. An upper end 32 of the bracket has a slot 34 and three deformations 36. The slot 34 has a slight curve and intersects the three deformations 36. The three deformations 36 form three recessed seats 38 for an inboard side 40 of the bracket and three protrusions 42 for an outboard side 44 of the bracket 24. As seen best in FIG. 2, the fastener assemblies 26 each comprise a first fastener 46 and a second fastener 48. The first fastener 46 has a head 50 and a bolt section 52. The bolt section 52 has a generally square section 54 and a threaded shaft section 56. The second fastener 48 has an enlarged hand grip section 58 and a section 60 that threadingly receives the threaded shaft section 56 of the first fastener 46.

In the embodiment shown, the bottom ends of the handle 18 are located on the outboard sides of the mounting plates 22. The brackets 24 are located on the inboard sides of the mounting plates 22. The brackets 24 are pivotally mounted to the plates 22 by pins 62 that pass through the holes 30. The brackets 24 are orientated such that the protrusions 42 face outward. The brackets 24 are located against the handle at the protrusions 42. The protrusions 42 thus function as spacers to span the gap formed by the thickness of the mounting plates 22.

The bolt section 50 of the first fasteners 46 are passed through the slots 34, into holes 64 in the handle 18, and the sections 60 of the second fasteners 48 are screwed onto the threaded shaft sections 56. The heads 50 are located in one of the recessed seats 38. This prevents relative movement of the first fasteners 46 relative to the brackets 24 along the slots 34. The square sections 54 are received in the slots 34 and function as a keying means to prevent axial rotation of the first fasteners 46 relative to the brackets 24.

When it is desired to adjust the height of the handle 18, by adjusting the angle of the handle 18 relative to the frame 12, a user loosens the second fasteners 48. The second fasteners 48 do not need to be removed from the first fasteners 46. When the connection of the first and second fasteners to each other is sufficiently loose to move the heads 50 out of the recessed seats 38, the handle 18 and brackets 24 can be pivoted on the mounting plates 22. The bolt sections 50 slide along the slots 34. When the heads 50 are located at their new recessed seat locations, the second fasteners 48 can be tightened on the first fasteners 46 to thereby stationarily hold the brackets and handle together again. With this type of connection, the problem of realigning formerly removed bolts with holes is eliminated. No additional spacers for the connection is necessary because the brackets have their own integral spacers formed by the protrusions 42. Other problems associated with disassembly and reassembly of parts for adjustment are also avoided.

In an alternate embodiment, more than three or less than three deformations could be provided. The deformation's need not be round, but could have any suitable shape. The heads of the first fasteners could also have any suitable cooperating shape. More than one slot could be provided in each bracket and the slots could have any suitable shape.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A lawn mower having a frame, a motor mounted on the frame, and a handle movably connected to the frame, the lawn mower further comprising:

a handle adjustment bracket having a first end pivotally connected to the frame and a second end, the second end having a slot therethrough with multiple recessed seats along the slot, the recessed seats not passing completely through the bracket; and a fastener assembly extending through the handle and through the slot in the bracket to connect the second end of the bracket to the handle, the fastener assembly having a first fastener with a head located in one of the seats to stationarily fix the head relative to the bracket and thereby stationarily fix the handle on the bracket.

2. A lawn mower as in claim 1 wherein the bracket is a one-piece flat metal member with the recessed seats stamped into the one-piece member.

3. A lawn mower as in claim 2 wherein the recessed seats are aligned in a row along the length of the slot.

4. A lawn mower as in claim 3 wherein the slot is elongate and slightly curved.

5. A lawn mower as in claim 1 wherein the first fastener has a shaft that extends from the head through the slot and through a hole in the handle.

6. A lawn mower as in claim 5 wherein the shaft has a square section that is received in the slot and prevents axial rotation of the shaft relative to the bracket, but which is slidable along the slot when the head is not located in one of the seats.

7. A lawn mower as in claim 5 wherein the fastener assembly further comprises a second fastener connected to the first fastener on an opposite side of the handle from the head.

8. A lawn mower as in claim 7 wherein the second fastener is threadingly connected to the first fastener and has an enlarged hand contact area for hand tightening and loosening of the second fastener on the first fastener.

9. In a lawn mower having a frame, a motor, and a handle pivotally connected to the frame, wherein the improvement comprises:

a handle adjustment bracket connected between the frame and the handle, the bracket comprising a one-piece member with a slot therethrough and a set of recessed seats along and intersecting the slot, wherein the slot interconnects the recessed seats and the set of recessed seats do not pass completely through the handle adjustment bracket.

10. A lawn mower as in claim 9 wherein the bracket is pivotally connected to the frame.

11. A lawn mower as in claim 9 further comprising a fastener assembly connecting the bracket to the handle, wherein the fastener assembly has a portion that is seated in one of the recessed seats to prevent the portion from moving along the slot.

12. A lawn mower as in claim 11 wherein the fastener assembly has a bolt with a portion of the bolt located in the slot that cooperates with the slot to prevent the bolt from axially rotating.

13. A lawn mower as in claim 9 wherein the bracket is comprised of sheet metal that is stamped to form the recessed seats in a first side.

14. In a lawn mower having a frame, a motor, and a handle pivotally connected to the frame, wherein the improvement comprises:

a handle adjustment bracket connected between the frame and the handle, the bracket comprising a one-piece member with a slot therethrough and recessed seats along and intersecting the slot, wherein the slot interconnects the recessed seats; and wherein a second side of the bracket is deformed outward to form a spacer for the bracket.

15. In a lawn mower having a frame, a motor, a handle pivotally connected to the frame, and a handle adjustment bracket connected between the frame and the handle by a fastener at a connection, wherein the improvement comprises:

the connection of the bracket to the handle with the fastener having means for loosening the fastener and adjusting the relative position of the handle and bracket without removing the fastener from the connection, wherein the means for loosening and adjusting includes a slot in the bracket and recessed seats along the slot with the recessed seats not passing completely through the handle adjustment bracket.

* * * * *